US008250152B2

(12) United States Patent
Cardona et al.

(10) Patent No.: US 8,250,152 B2
(45) Date of Patent: Aug. 21, 2012

(54) E-MAIL DELIVERY OPTIONS USABILITY TOOL

(75) Inventors: Omar Cardona, Austin, TX (US); Ricardo N. Olivieri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1340 days.

(21) Appl. No.: 11/462,284

(22) Filed: Aug. 3, 2006

(65) Prior Publication Data

US 2008/0043942 A1  Feb. 21, 2008

(51) Int. Cl.
*G06F 15/16* (2006.01)
(52) U.S. Cl. ........................................ 709/206; 709/207
(58) Field of Classification Search .................. 709/206, 709/207
See application file for complete search history.

(56) References Cited

U.S. PATENT DOCUMENTS

| | | | | |
|---|---|---|---|---|
| 5,127,087 | A * | 6/1992 | Kasiraj et al. ................. | 709/206 |
| 5,790,790 | A * | 8/1998 | Smith et al. .................... | 709/206 |
| 6,185,603 | B1 | 2/2001 | Henderson et al. | |
| 6,192,396 | B1 * | 2/2001 | Kohler ........................... | 709/206 |
| 6,628,306 | B1 * | 9/2003 | Marchionda .................. | 715/752 |
| 6,711,154 | B1 | 3/2004 | O'Neal | |
| 7,333,223 | B2 * | 2/2008 | Gupton et al. ................. | 358/1.15 |
| 2002/0112010 | A1 * | 8/2002 | Soroker et al. ................. | 709/206 |
| 2002/0138547 | A1 | 9/2002 | Cherry et al. | |
| 2003/0200263 | A1 * | 10/2003 | Goldberg ....................... | 709/206 |
| 2004/0267889 | A1 * | 12/2004 | Graham et al. ................ | 709/206 |
| 2005/0021635 | A1 * | 1/2005 | Graham et al. ................ | 709/206 |
| 2005/0027804 | A1 * | 2/2005 | Cahill et al. ................... | 709/206 |
| 2005/0201536 | A1 | 9/2005 | LaLonde et al. | |
| 2005/0262383 | A1 | 11/2005 | Sierer et al. | |
| 2006/0041624 | A1 * | 2/2006 | Lyle et al. ...................... | 709/206 |
| 2006/0075052 | A1 | 4/2006 | Oostendorp | |

OTHER PUBLICATIONS

Outlook 2003 Message Options, "Outlook 2003 Message Options" from http://www2.lse.ac.uk/intranet/LSEServices/itservices/guides/softwareAndTraining/microsoftOffice/outlook/Message-Options.aspx.*
Outlook 2003 Insert a Signature, "Insert a signature in a message", from http://office.microsoft.com/en-us/outlook-help/insert-a-signature-in-a-message-HP005242753.aspx.*
ISR including PCT transmittal & Written Opinion, From the International Searching Authority, mailed Sep. 25, 2007, Applicant: International Business Machines Corporation, International Application No. PCT/EP2007/057679, pp. —11.

* cited by examiner

*Primary Examiner* — David Lazaro
*Assistant Examiner* — Edward Kim
(74) *Attorney, Agent, or Firm* — Mark Vallone, Esq.; Heslin Rothenberg Farley & Mesiti P.C.

(57) ABSTRACT

Generally speaking, systems, methods and media for facilitating user-specified delivery options for e-mail messages are disclosed. Embodiments of the method may include receiving by an e-mail client an indication of contents of an e-mail message and a plurality of intended recipients of the e-mail message and generating the e-mail message based on the received indication. Embodiments may also include receiving an indication of user-specified delivery options for each intended recipient of the message, generating meta-data based on the user-specified delivery options, and adding an indication of the meta-data to the message, such as in the data area of the e-mail message. Embodiments may also include transmitting the e-mail message to a mail server. The user-specified delivery options may include one or more of attachment delivery options, signed copy recipient options, signature options, message importance options, return receipt options, delivery priority options, prevent copy recipient options, or message formatting options.

16 Claims, 7 Drawing Sheets

E-MAIL DELIVERY OPTIONS USABILITY TOOL

FIELD OF INVENTION

The present invention is in the field of data processing systems and, in particular, to systems, methods and media for facilitating user-specified delivery options for e-mail messages.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM or DVD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. The use of mobile computing devices, such as notebook PCs, personal digital assistants (PDAs), sophisticated wireless phones, etc., has also become widespread. Mobile computing devices typically exchange some functionality or performance when compared to traditional PCs in exchange for smaller size, portable power, and mobility.

The widespread use of PCs and mobile computing devices in various segments of society has resulted in a reliance on computer systems both at work and at home, such as for telecommuting, news, stock market information and trading, banking, shopping, shipping, communication in the form of hypertext transfer protocol (http) and e-mail, as well as other services. Many of these functions take advantage of the communication abilities offered by the Internet or other networks, such as local area networks. One function that continues to grow in importance is e-mail (also known as electronic mail) as more and more users utilize e-mail for many, if not most, of their communications. Typically, a user sends and receives e-mail via an e-mail client that itself communicates with one or more mail servers to facilitate communication with other users over a local area network (LAN) or the Internet. Many of these users can receive hundreds of e-mails per day, making efficient management of the e-mails increasingly important. This problem can be exacerbated in a corporate environment as the rapidly increasing use of e-mail results in an increasing strain on corporate network, storage, or other computing resources.

To facilitate management of e-mails, many e-mail clients allow users to specify delivery options for a particular e-mail message. A user, for example, may specify a message as high priority to indicate to recipients that particular attention should be paid to the e-mail message. Similarly, a user may specify another e-mail message as low priority so that recipients may avoid reviewing the message until a more convenient time, which assists the recipients in managing their workload effectively. Other delivery options may include the addition of digital signatures, digitally signed e-mails, attachment of a file, return receipt requests, or other options. While many of these options are useful to users, they also increase can network traffic and increase the burden of system resources. If a user, for example, attaches a file to an e-mail message, that file must be transmitted to each recipient and potentially stored on each of their systems. The different delivery options thus result in increased use of system resources in spite of their usability benefits to e-mail client users. Users could solve this problem by refraining from using the delivery options in some situations, but this solution results in those users losing the efficiency benefits resulting from the delivery options. Users sending an attachment can also reduce the impact on the network by compressing files before transmittal, but such compression can waste time for the user as well as increasing the possibility of incompatibilities or compression errors.

SUMMARY OF THE INVENTION

The problems identified above are in large part addressed by systems, methods and media for facilitating user-specified delivery options for e-mail messages. Embodiments may include a method for transmitting an e-mail message. Embodiments of the method may include receiving by an e-mail client from a user an indication of contents of an e-mail message and a plurality of intended recipients of the e-mail message. Embodiments of the method may also include receiving from the user an indication of user-specified delivery options for each intended recipient of the e-mail message and generating the e-mail message based on the received indication of e-mail contents and the intended recipients. Embodiments of the method may also include generating meta-data based on the user-specified delivery options and adding an indication of the generated meta-data to the generated e-mail message. Embodiments of the method may also include transmitting the e-mail message to a mail server. Further embodiments of the method may include establishing a connection with the mail server or receiving return information from the mail server. The user-specified delivery options may include one or more of attachment delivery options, signed copy recipient options, signature options, message importance options, return receipt options, delivery priority options, prevent copy recipient options, or message formatting options. In some embodiments, the received indication of user-specified delivery options for each recipient may include an indication of whether the user desires for each recipient to receive the e-mail message consistent with one or more delivery options. The user-specified delivery options that are available may also be configured for an organization. In some embodiments, adding the indication of the generated meta-data to the generated e-mail message may include inserting the generated meta-data into a data area of the e-mail message, attaching the generated meta-data to the e-mail message, or inserting the generated meta-data into a header area of the e-mail message.

Another embodiment provides a computer-readable data storage medium containing instructions effective, when executing in a data processing system, to cause the system to perform a series of operations for transmitting an e-mail message. The series of operations generally includes a series of operations for receiving by an e-mail client from a user an indication of contents of an e-mail message and a plurality of intended recipients of the e-mail message. Embodiments may also include a series of operations for receiving from the user an indication of user-specified delivery options for each intended recipient of the e-mail message and generating the e-mail message based on the received indication of e-mail contents and the intended recipients. Embodiments may also include a series of operations for generating meta-data based on the user-specified delivery options and adding an indication of the generated meta-data to the generated e-mail message. Embodiments may also include a series of operations for transmitting the e-mail message to a mail server.

A further embodiment provides an e-mail client system including a user interface, an e-mail message manager, a customized e-mail delivery module, and a mail server interface. The user interface may receive input from a user where the user input includes an indication of contents of an e-mail message, intended recipients of the e-mail message, and one or more user-specified delivery options for at least one intended recipient. The e-mail message manager may generate the e-mail message based on the received user input. The customized e-mail delivery module may generate meta-data based on the user-specified delivery options and add an indication of the generated meta-data to the e-mail message. The mail server interface may transmit the e-mail message to a mail server.

Another embodiment provides a method for handling an e-mail message. Embodiments of the method may include receiving by a mail server from an e-mail client an e-mail message and extracting meta-data from the e-mail message, where the meta-data includes an indication of user-specified delivery options for one or more intended recipients of the e-mail message. Embodiments of the method may also include determining delivery options for each intended recipient of the e-mail message based on the extracted meta-data and modifying the e-mail message for each recipient based on the user-specified delivery options to generate two or more e-mail messages with different delivery options. Embodiments of the method may also include transmitting the modified e-mail message to the intended recipients.

Another embodiment provides an e-mail system including an e-mail client and a mail server. Embodiments of the e-mail client may include a user interface, a customized e-mail delivery module, and a mail server interface. The user interface may receive input from a user where the user input includes an indication of contents of an e-mail message, intended recipients of the e-mail message, and one or more user-specified delivery options for each intended recipient. The customized e-mail delivery module may generate meta-data based on the user-specified delivery options and add an indication of the generated meta-data to the e-mail message. The mail server interface may transmit the e-mail message to the mail server. The mail server may include a communication module having an e-mail client interface to receive an e-mail message from the e-mail client. The mail server may also include a delivery handler module to extract from received e-mail messages meta-data providing user-specified delivery options and to modify e-mail messages for each recipient of the e-mail message based on the user-specified delivery options.

BRIEF DESCRIPTION OF THE DRAWINGS

Aspects of certain embodiments of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for facilitating user-specified delivery options for e-mail messages. Embodiments of the method may include receiving by an e-mail client from a user an indication of contents of an e-mail message and a plurality of intended recipients of the e-mail message and generating the e-mail message based on the received indication. Embodiments may also include receiving an indication of user-specified delivery options for each intended recipient of the message, generating meta-data based on the user-specified delivery options, and adding an indication of the meta-data to the message, such as in the data area of the e-mail message. Embodiments may also include transmitting the e-mail message to a mail server. The user-specified delivery options may include one or more of attachment delivery options, signed copy recipient options, signature options, message importance options, return receipt options, delivery priority options, prevent copy recipient options, or message formatting options.

The system and methodology of the disclosed embodiments allows for a user to efficiently choose separate delivery options for each recipient of an e-mail message. The disclosed methodology may eliminate the need to apply a coarse, broad approach to delivery options where users are forced to select a delivery option and have it apply to every recipient. A user may choose, for example, to only send an attachment to some recipients while other recipients do not receive the attachment (and may optionally receive an indication that an attachment was originally sent). This may reduce network traffic by allowing a user to avoiding sending large attachments to those who do not need a copy (or those using low bandwidth wireless devices to receive e-mail messages). Recipients may also benefit by not receiving unnecessary documents to clutter their hard drive or e-mail in-box. Users may also customize other delivery options, such as importance statuses, return receipt selections, or other delivery options. In another example, a user may classify the e-mail message as 'urgent' status for the primary recipient while the user may classify the message as 'normal' or 'low' for other, secondary recipients. The recipients in this example may receive a more accurate indication of the status of the e-mail to them instead of the coarser approach of previous methods that provided the same status to each recipient. Similarly, a sending user may only require a return receipt from one recipient and not other recipients, eliminating the need to request and receive return receipts from each addressee (and the associated network traffic). By allowing users to customize the delivery options for each recipient of an e-mail, the disclosed e-mail delivery options usability tool may provide an enhanced e-mail experience to both the sender and recipient and may also reduce network, computational, and storage resources required for an e-mail message.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware and/or software systems. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored or distributed on computer-readable data storage medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable data storage medium providing program code for use by or in connection with a computer or any instruction execution system. For the purposes of this description, a computer-usable or computer readable data storage medium can be any apparatus that can store the program for use by or in connection with the instruction execution system, apparatus, or device. The data storage medium may be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Figure 1:
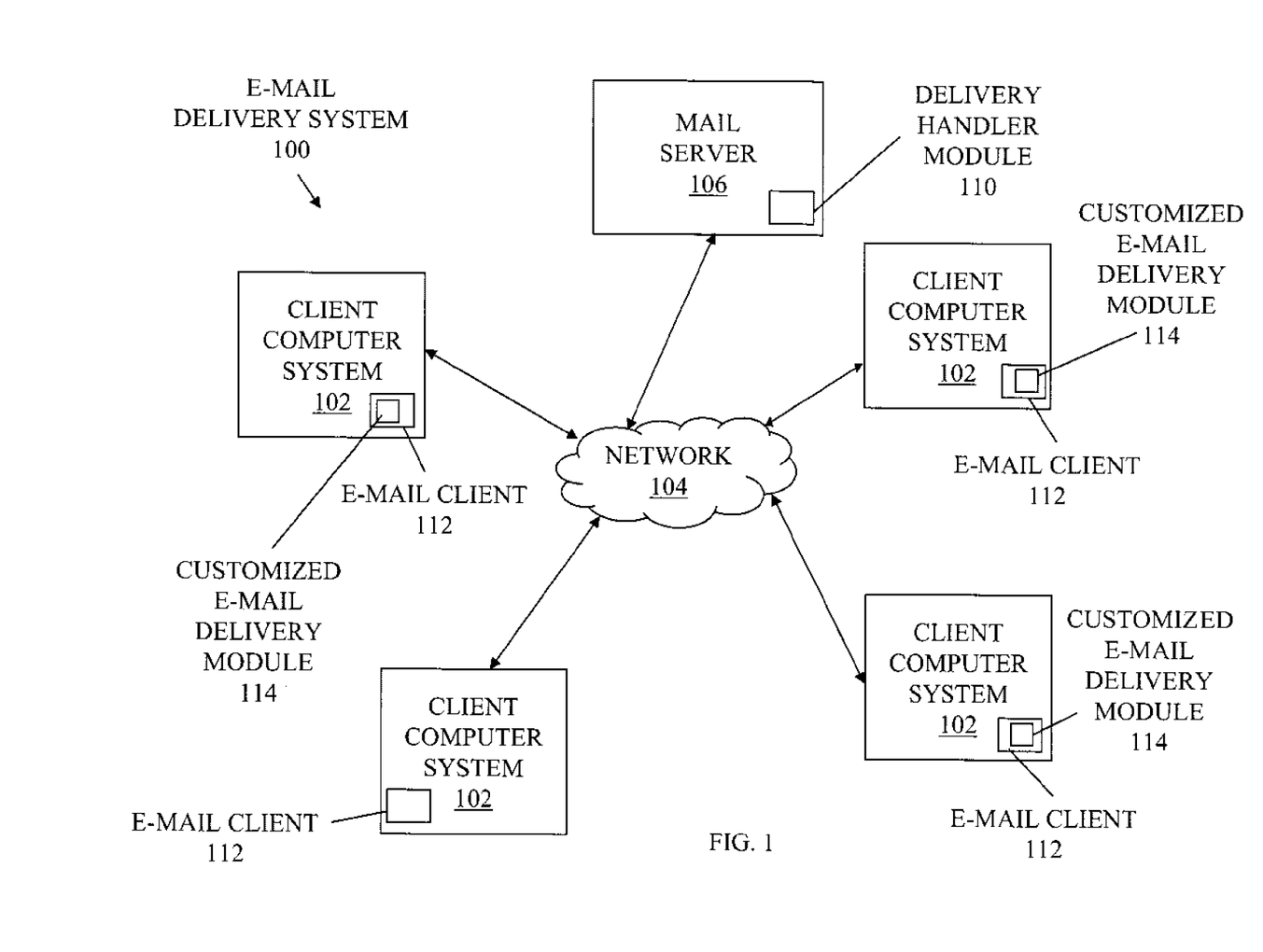
FIG. 1 depicts an environment for an e-mail delivery system with a mail server and a plurality of client computer systems with customized e-mail delivery modules according to some embodiments.

Turning now to the drawings, FIG. 1 depicts an environment for an e-mail delivery system with a mail server and a plurality of client computer systems with customized e-mail delivery modules according to some embodiments. In the depicted embodiment, the e-mail delivery system 100 includes a plurality of client computer systems 102 each in communication with a mail server 106 via a network 104. A user may utilize an e-mail client 112 of a client computer system 102, and in particular a customized e-mail delivery module 114 of the e-mail client 112, to compose an e-mail message, to selectively choose delivery options for each recipient of the e-mail message, and to transmit the e-mail message to the mail server 106 for distribution and delivery. Users may also use an e-mail client 112 to receive e-mail messages. A client computer system 102 without a customized e-mail delivery module 114 may not be able to transmit e-mail messages with selective delivery options but may, in some embodiments, still be able to receive such e-mail messages. The mail server 106 may analyze the e-mail messages via delivery handler module 110 to determine the delivery options selected by the user and may then modify the e-mail messages as necessary before delivery to their destination. The mail server 106 of some embodiments may be compatible with both recipients that are enabled with the e-mail delivery system 100 as well as legacy recipients. As will be described in more detail subsequently, the disclosed e-mail delivery system 100 facilitates a user selectively choosing delivery options for each intended recipient, allowing the user to fine-tune their e-mails and avoid unnecessary network traffic and other burdens on system resources.

Client computer systems 102 may each include one or more personal computers, workstations, servers, mainframe computers, notebook or laptop computers, desktop computers, PDAs, set-top boxes, mobile phones, wireless devices, or the like. In some embodiments, client computer system 102 may be a computer system as described in relation to FIG. 2 and may be in wired or wireless communication with network 104. In other embodiments, as another example, a client computer system 102 may be a mobile phone with e-mail messaging capability. Client computer systems 102 may each may be in wired or wireless communication with network 104.

The e-mail client 112 of the client computer system may, in some embodiments, be a dedicated e-mail client. Dedicated e-mail clients have a primary function of allowing a user to read, write, and send e-mail messages. Dedicated e-mail clients include Microsoft Corporation's Microsoft Office Outlook®, Mozilla Corporation's Thunderbird, Qualcomm Incorporated's Eudora™, and Apple Computer, Inc.'s Apple- Mail®. In other embodiments, e-mail client 112 may be implemented as a Web-based e-mail client 112, such as those accessible via a browser. Example e-mail clients 112 accessed by a user via a browser include Google Inc.'s Gmail™, Yahoo! Inc.'s Yahoo!® Mail, Microsoft Corporation's MSN® Hotmail, and AOL LLC's AOL® mail. A browser may be a graphical browser application that allows a user to view Internet or intranet content such as Microsoft Corporation's Internet Explorer™, Netscape Communication Corporation's Navigator™, Mozilla Foundation's Firefox, Opera Software ASA's Opera, Apple Corporation's Safari™, etc. Browsers, at their most basic level of operation, permit users to connect to a given network site, download informational content from that site, and display that information to the user. A user may interact with the e-mail client 112 via user input devices of the client computer system 102 such as a mouse, keyboard, voice input device, etc., as will be described in more detail subsequently.

As will be described in more detail subsequently, the customized e-mail delivery module 114 of the e-mail client 112 may facilitate a user specifying delivery options for one or more recipients of an e-mail message. The customized e-mail delivery module 114 may be downloaded and installed as a separate component of the e-mail client 112, may be fully or partially integrated with the e-mail client 112, or otherwise implemented with the e-mail client 112. The customized e-mail delivery module 114 may generate meta-data based on the user-specified delivery options and add an indication of the meta-data to the e-mail message before transmission to the mail server 106.

Delivery options may include any options that may impact the timing, form, nature, presentation, or other aspect of the delivery of an e-mail message to a recipient. For each delivery option, a user may specify that the e-mail message to a particular recipient be consistent with that option. For example, a user may specify that a delivery option be on, off, or an intermediate position for each recipient. Attachment delivery options are one example delivery option and may serve to illustrate the flexibility of the disclosed system. A user sending an e-mail message with an attachment may specify that some users receive the attachment with the e-mail message (delivery option is 'on'), that other users do not receive the attachment but instead receive a notice that an attachment was sent to other users (delivery option is 'off' but receive notification), and that yet other users do not receive an attachment nor notification (delivery option is 'on'). In this way, a user may advantageously customize the delivery of e-mail message to each recipient to provide a flexible e-mail messaging solution.

Other types of delivery options include signed copy recipient options (i.e., whether or not recipients receive a signed copy of a message), signature options (i.e., whether or not recipients receive a signature, or closing information, in a message), message importance options (i.e., whether the message is labeled urgent, normal, or low importance), return receipt options (i.e., whether or not the sender receives a return receipt from the sender), delivery priority options (order of delivery preference given to e-mail message while it is being transferred in the network), prevent copy recipient options (i.e., whether or not recipients are allowed to forward or copy the message), or message formatting options (the format, such as HTML or plain text, for the delivered message). One of ordinary skill in the art will recognize that any other type of delivery option may be utilized. A customized e-mail delivery module 114 may use one or more delivery options and any particular recipient may have settings for any of the delivery options. In one example, a user may specify that a first recipient receive an attachment but no signature while another user receive a signature, no attachment and have the message marked 'urgent'.

Network 104 may be any type of data communications channel or combination of channels, such as the Internet, an intranet, a LAN, a WAN, an Ethernet network, a wireless network, telephone network, a proprietary network, or a broadband cable network. The Internet or other public network may be particularly useful as network 104 when the client computer systems 102 are widely distributed from the application server 106 as communications between these systems will be facilitated. Similarly, a corporate intranet may serve as network 104 for communications with an internal corporate computing environment. Those skilled in the art will recognize, however, that the invention described herein may be implemented utilizing any type or combination of data communications channel(s) without departure from the scope and spirit of the invention.

Mail server 106 may be an application that receives, processes, and transmits e-mail from and to e-mail clients 112 or other mail servers 106, as well as a server computer system that executes the mail server 106 application. Mail server 106 may be in wired or wireless communication with network 104. Mail server 106 may in some embodiments be implemented on a server computer, such as an International Business Machine Corporation (IBM) eServer® server, or a computer system as described in relation to FIG. 2. Example mail servers include Lotus Software's (a subsidiary of IBM) Lotus® Notes® Mail Server or a Microsoft Corporation Microsoft® Exchange Server.

In the e-mail delivery system 100, the client computer systems 102 and mail servers 106 may be located at the same location, such as in the same building or computer lab, or could be remote. While the term "remote" is used with reference to the distance between the components of the e-mail delivery system 100, the term is used in the sense of indicating separation of some sort, rather than in the sense of indicating a large physical distance between the systems. For example, any of the components of the e-mail delivery system 100 may be physically adjacent or located as part of the same computer system in some network arrangements.

In some embodiments, the e-mail delivery system 100 may be implemented at an organization where the mail server 106 and client computer system 102 are connected via a LAN or other network 104. In this embodiment, each client computer system 102 utilizes a mail server 106 with a delivery handler module 110 operated by the organization. The delivery handler module 110 of this embodiment accordingly knows that each e-mail client 112 has a customized e-mail delivery module 114 and is thus enabled with the e-mail delivery system 100. The delivery handler module 110 of this embodiment may therefore provide full functionality to each e-mail client 112 with respect to the customized e-mail delivery modules 114. An administrator may also configure the components of the e-mail delivery system 100 to be consistent with organizational preferences. The administrator may, for example, provide the same delivery options and restrict the same delivery options for each e-mail client 112 of the e-mail delivery system 100 for consistent usage across the organization. Users may also transmit-mail messages to outside recipients that do not have customized e-mail delivery modules 114 on their e-mail clients 112. To do so, the delivery handler module 110 of the mail server 106 may remove the meta-data from the e-mail message so as to not confuse non-enabled e-mail clients 112.

In other embodiments, the e-mail delivery system 100 may be distributed over many users, some having enabled e-mail clients 112 and some having non-enabled e-mail clients 112. In these embodiments, the delivery handler module 110 may remove the meta-data if it knows the recipient is non-enabled (or optionally if it does not know) and leave the meta-data if it knows that the recipient has a customized e-mail delivery module 114. The delivery handler module 110 may also perform other actions, such as removing attachments or changing urgency statuses, based on defaults or user preferences instead of simply removing the meta-data. This may provide significant flexibility in handling legacy e-mail clients 112 or e-mail clients 112 without customized e-mail delivery modules 114.

The systems and methodologies of the disclosed embodiments provide an efficient and effective mechanism for providing selective delivery options for recipients of an e-mail message. A user may specify different delivery options for each recipient of their e-mail message, allowing the user to precisely tailor their message for individual recipients. Recipients of e-mail messages may also benefit as they may often avoid unnecessary attachments, digital signatures, high priority messages, or other delivery options. The disclosed embodiments may also be compatible with legacy systems that do not have selective delivery option capability.

Figure 2:
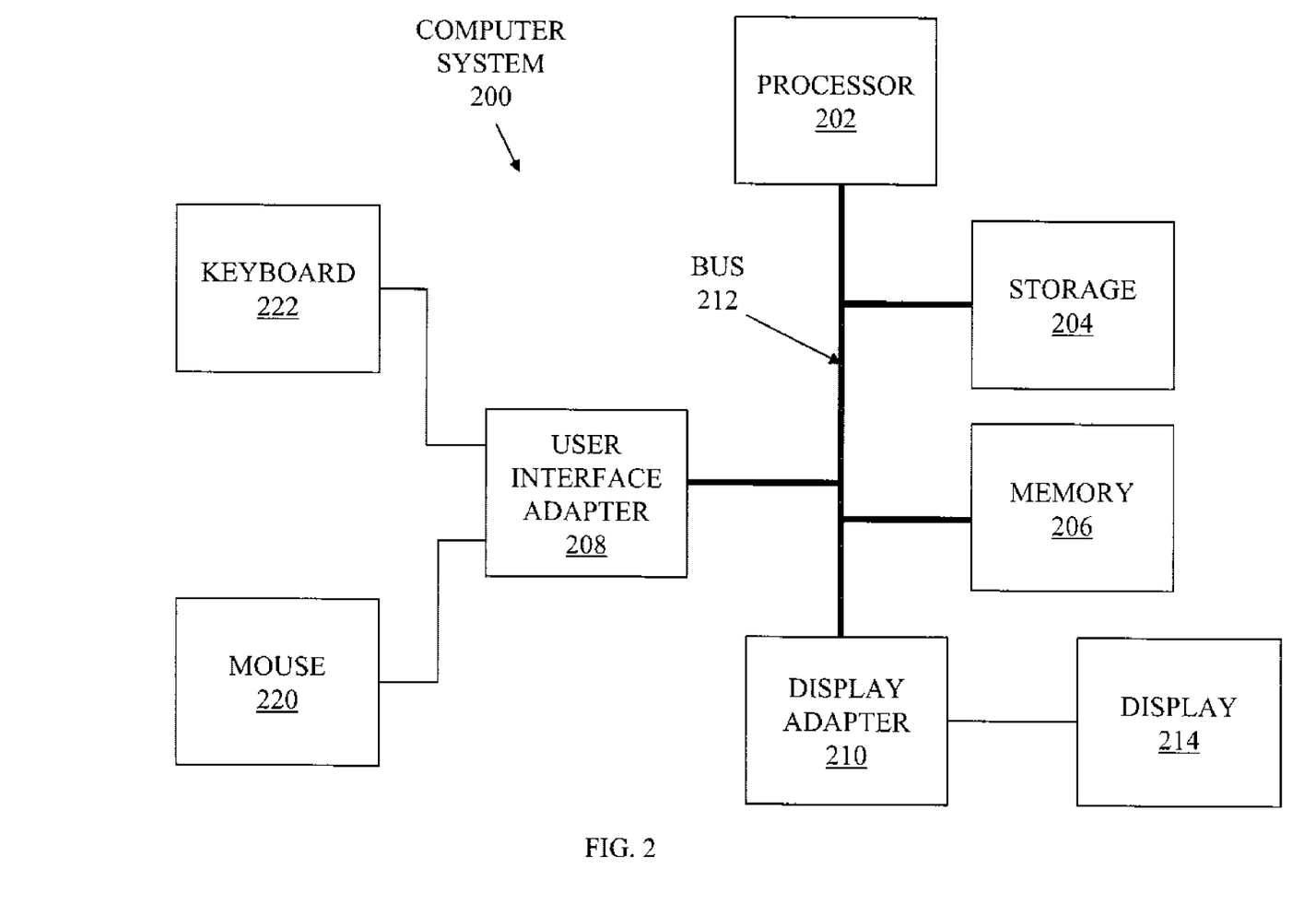
FIG. 2 depicts a block diagram of one embodiment of a computer system suitable for use as a component of the e-mail delivery system, such as a client computer system or mail server.

FIG. 2 depicts a block diagram of one embodiment of a computer system 200 suitable for use as a component of the e-mail delivery system 100, such as a client computer system 102 or mail server 106. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, a processor 202 may execute instructions to perform functions of the client computer system 102 or mail server 106, such as generating, inserting, or extracting meta-data to or from an e-mail message, and may temporarily or permanently store information during its calculations or results after calculations in storage 204 or memory 206.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. For a client computer system 102, a user may utilize the keyboard 222 and mouse 220 to interact with an e-mail client 112 to, for example, compose an e-mail message or select delivery options for one or more recipients. The bus 212 may also connect the processor 202 to a display, such as an LCD display or CRT monitor, via the display adapter 210.

Figure 3:
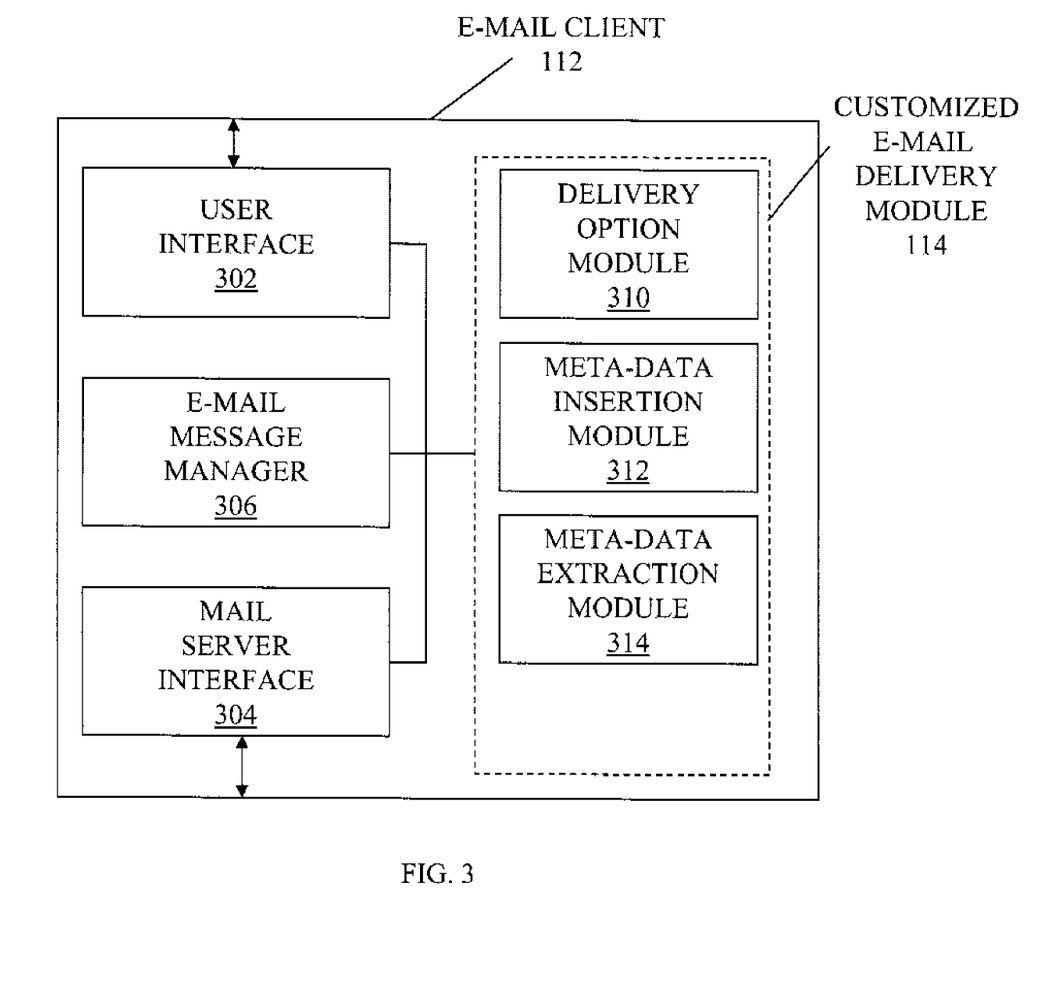
FIG. 3 depicts a conceptual illustration of software components of an e-mail client of the e-mail delivery system according to some embodiments.

FIG. 3 depicts a conceptual illustration of software components of an e-mail client 112 of the e-mail delivery system 100 according to some embodiments. As described previously (and in more detail in relation to FIGS. 5 and 7), the e-mail client 112 and its customized e-mail delivery module 114 may send and receive e-mail messages having meta-data associated with user-specified delivery options. The e-mail client 112 may include a user interface 102, a mail server interface 304, and an e-mail message manager 306 in addition to the customized e-mail delivery module 114. The user interface 302 may provide for providing information to a user as well as receiving information from a user and passing it to another component, such as by providing or receiving information via the display 214, keyboard 222, or mouse 220 of the computer system 200 of FIG. 2. Information received by the user interface 302 may include the contents of an e-mail message, its intended recipients, and user-specified delivery options for one or more of the intended recipients. The mail server interface 304 may provide for communications to and from a mail server 106, including sending and receiving e-mail messages. The e-mail message manager 306 may be a software application that facilitates a user composing and viewing e-mail messages, and may include a text editor, address book, storage of received messages or drafts, or other e-mail-related functions.

The customized e-mail delivery module 114 may provide for sending and receiving e-mail messages for recipient-specific delivery options. The customized e-mail delivery module 114 may be a stand-alone application or integrated with the e-mail message manager 306 and other components of the e-mail client 112. The customized e-mail delivery module 114 may include a delivery option module 310, a meta-data insertion module 312, and a meta-data extraction module 314. The delivery option module 310 may provide a list of available delivery options to a user (in conjunction with other components of e-mail client 112) and may receive and process selections of particular delivery options for one or more recipients of an e-mail message. The delivery option module 310 may also provide for default settings (which may be organizational standards, user-selected defaults, etc.) of delivery options as well as group selections. Group selections may provide users with the ability to specify delivery options for groups of recipients, such as by selecting a particular option (e.g., high importance) to employees on their project team.

The meta-data insertion module 312 may generate meta-data based on user-specified delivery options provided by the delivery option module 312 and add an indication of the generated meta-data to the e-mail message. In some embodiments, the meta-data insertion module 312 may add the generated meta-data into a data area of the e-mail message. These embodiments provide an effective solution that does not require changing e-mail protocols, as the meta-data may be added into the body of the data area. In these embodiments, the beginning and/or end of the meta-data may optionally be signified by particular characters or words. In other alternative embodiments, the meta-data insertion module 312 may, as examples, add the meta-data by inserting the meta-data into a header area or attaching the meta-data in a separate file. The optional meta-data extraction module 314 may extract meta-data from a received e-mail message and may cooperate with other components, such as an e-mail message manager 306, to provide the e-mail message to the user consistent with the delivery options specified in the meta-data. For example, if the extracted meta-data indicated that the e-mail message should have 'low' importance, the meta-data extraction module 314 may provide such information to the e-mail message manager 306 so that the e-mail message can be appropriately displayed. As will be described, some delivery option functionality may be accomplished without a meta-data extraction module 314 (similarly to legacy systems without customized e-mail delivery modules 114) and e-mail messages consistent with at least some of the sending user's preferences may be received.

Figure 4:
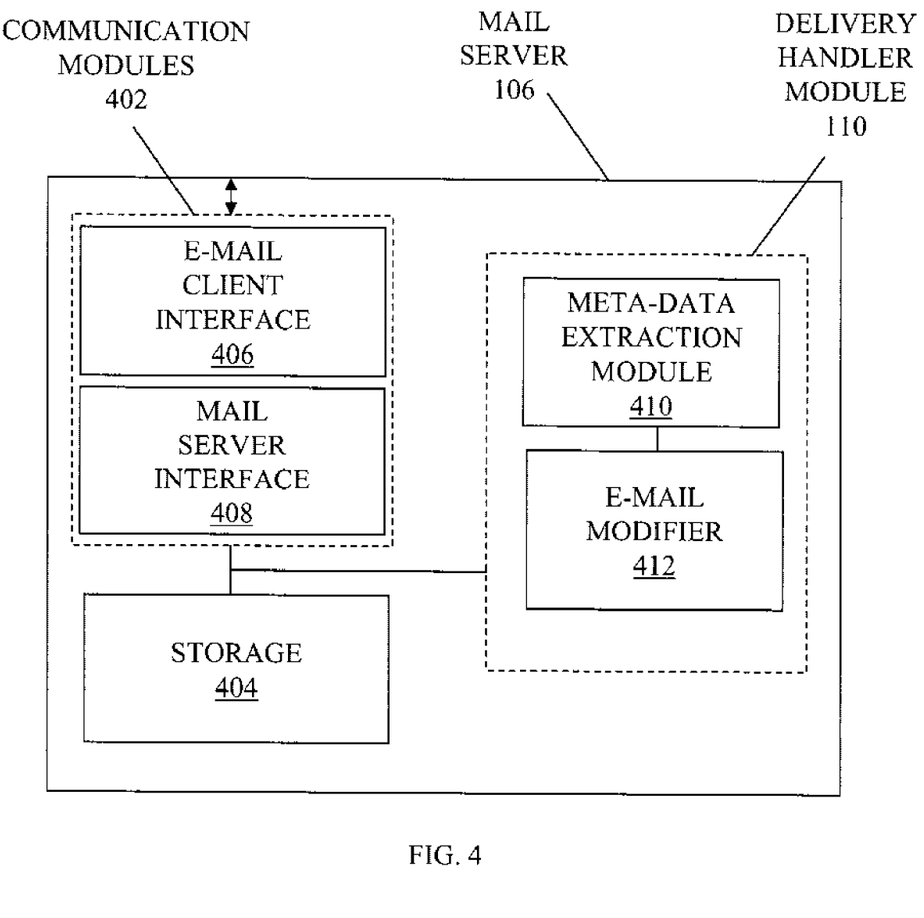
FIG. 4 depicts a conceptual illustration of software components of a mail server of the e-mail delivery system according to some embodiments.

FIG. 4 depicts a conceptual illustration of software components of a mail server 106 of the e-mail delivery system 100 according to some embodiments. As described previously (and in more detail in relation to FIG. 6), the mail server 106 and its delivery handler module 110 may handle e-mail messages having meta-data associated with user-specified delivery options by receiving, analyzing, and forwarding the e-mail messages. The mail server 106 may include a communication module 402 and storage in addition to the delivery handler module 110. The communication module 402 may provide for communication with e-mail clients 112 and other mail servers 106 via sub-modules such as an e-mail client interface 406 and a mail server interface 408. The e-mail client interface 406 may transmit and receive e-mail messages from e-mail clients 112 and may also handle other related tasks, such as by granting authorization to access e-mail functionality or applying user-defined rules (e.g., barring particular recipients). The mail server interface 408 may provide for transmittal of e-mail messages to and receiving e-mail messages from other mail servers 106. The basic interaction for sending and receiving e-mail messages between mail servers 106 is known in the art. Mail server storage 404 may store e-mail messages for local users, e-mail messages in transit that are temporarily stored, a list of users and authentication information, or other information.

The delivery handler module 110 may handle e-mail messages with meta-data associated with user-specified delivery options. To perform its tasks, the delivery handler module 110 may have sub-modules such as a meta-data extraction module 410 and an e-mail modifier 412. The meta-data extraction module 410 may analyze a received e-mail message to be transmitted to recipients and may also extract the meta-data associated with user-specified delivery options from the e-mail. The e-mail modifier 412 may then analyze the extracted meta-data and modify the e-mail message, as necessary, for different recipients. After the e-mail modifier 412 modifies the e-mail message appropriately, the communication modules 402 may transmit the modified e-mail message to its destination. The e-mail modifier 412 may modify the e-mail message for each recipient or group of recipients based on the user-specified delivery options, resulting in multiple versions of the e-mail message. For example, the e-mail modifier 412 may create e-mail messages with and without attachment, with different urgency levels, with and without signatures, or other modifications. The e-mail modifier 412 may accomplish these modifications by modifying the meta-data in the message or by removing it entirely. In some embodiments, the e-mail modifier 412 may remove all delivery option meta-data from the e-mail message for any recipients that do not have recipient-specific delivery option capability.

Figure 5:
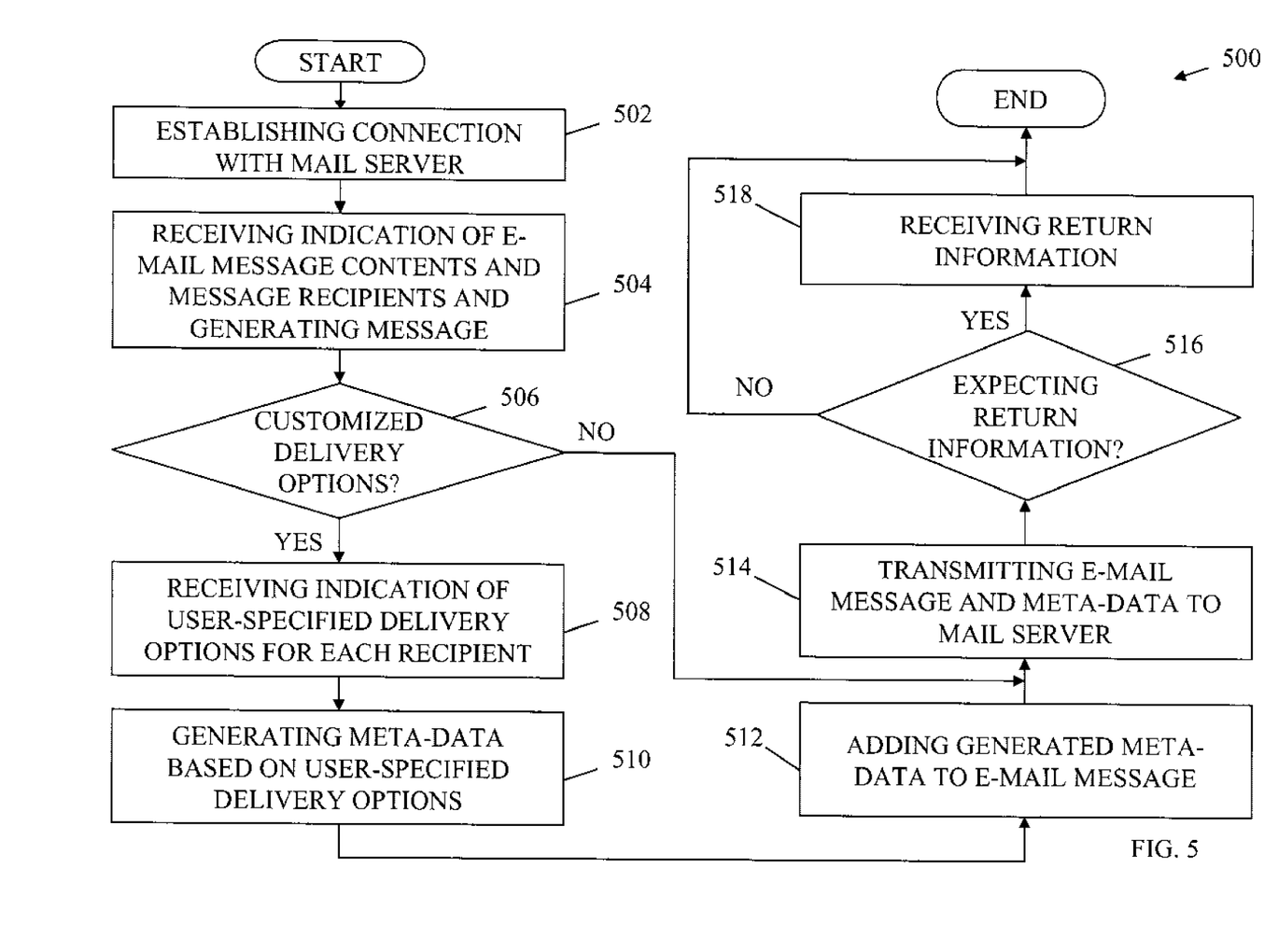
FIG. 5 depicts an example of a flow chart for generating and transmitting an e-mail with user-specified delivery options according to some embodiments.

FIG. 5 depicts an example of a flow chart 500 for generating and transmitting an e-mail with user-specified delivery options according to some embodiments. The method of flow chart 500 may be performed, in one embodiment, by components of an e-mail client 112, such as a customized e-mail delivery module 114. Flow chart 500 begins with optional element 502, where the mail server interface 304 of the e-mail client 112 may establish a connection with a mail server 106. At element 504, the user interface 302 (in conjunction with the e-mail message manager 306) may receive an indication of desired e-mail message contents and the intended recipients of the e-mail message, after which the e-mail message manager 306 may generate the e-mail message based on the message contents and intended recipients.

The customized e-mail delivery module 114 may determine at decision block 506 whether the user has requested user-specified delivery options for one or more recipients. If so, the delivery option module 310 of the customized e-mail delivery module 114 may receive at element 508 an indication of the user-specified delivery options for one or more of the recipients. The meta-data insertion module 312 may at element 510 generate meta-data based on the user-specified delivery options and may add the generated meta-data to the e-mail message at element 512. The generated meta-data may be in any format sufficient to provide an indication of user-specified delivery options. As described previously, the meta-data insertion module 512 may add the meta-data to the message by adding the generated meta-data into a data area of the e-mail message, by adding the meta-data by inserting the meta-data into a header area, by attaching the meta-data in a separate file, or by other methodology. While the generation of an e-mail message and adding the meta-data are described as separate steps, they may also be performed simultaneously by generating an e-mail with embedded meta-data after receiving the appropriate information.

After the meta-data has been added to the e-mail message (or after it was determined that no user-specified delivery options were provided), the method of flow chart 500 may continue to element 514, where the mail server interface 304 may transmit the e-mail message (with any included meta-data) to the mail server 106 for forwarding to the appropriate recipients. At optional decision block 516, the mail server 112 may determine whether it expects to receive return information, such as a return receipt from one or more recipients, and if so it may receive such return information at element 518. After transmitting the e-mail message at element 514 or optionally receiving return information at element 518, the method may terminate.

Figure 6:
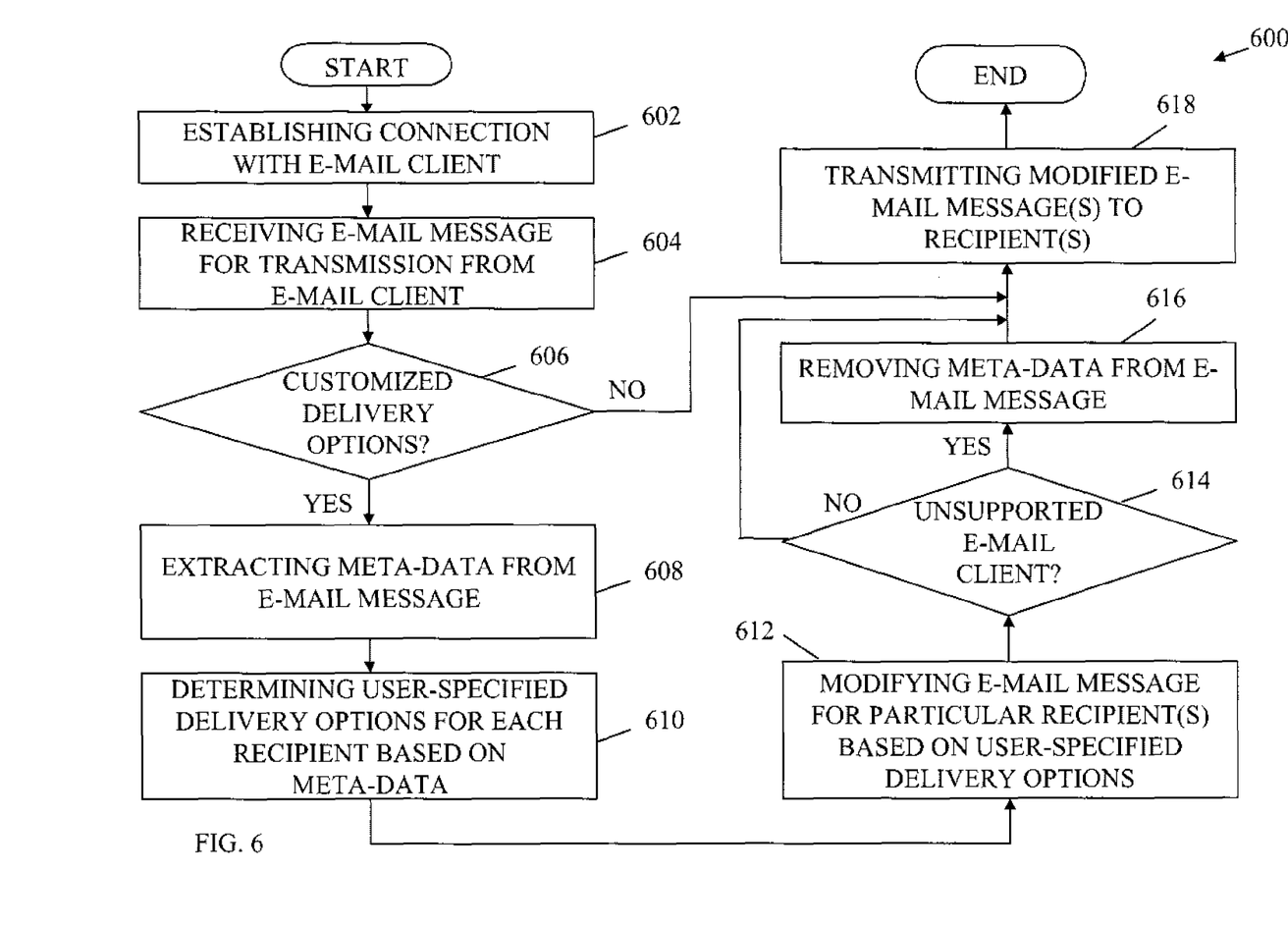
FIG. 6 depicts an example of a flow chart for modifying an e-mail message based on user-specified delivery options according to some embodiments.

FIG. 6 depicts an example of a flow chart 600 for modifying an e-mail message based on user-specified delivery options according to some embodiments. The method of flow chart 500 may be performed, in one embodiment, by components of a mail server 106, such as a delivery handler module 110. Flow chart 600 begins with optional element 602, where the e-mail client interface 406 of the mail server 106 may establish a connection with an e-mail client 112. At element 604, the e-mail client interface 406 may receive an e-mail message for transmission from the e-mail client 112. The delivery handler module 110 may determine at decision block 606 whether the received e-mail message has meta-data associated with user-specified delivery options. If so, the method of flow chart 600 may continue to element 608, where the meta-data extraction module 410 may extract the meta-data from the e-mail message. In some embodiments, extraction of the meta-data may include removing the meta-data from the e-mail message, while in other embodiments extraction may include access the meta-data to determine the contents of the meta-data.

After the meta-data has been extracted, the e-mail modifier 412 may at element 610 determine the user-specified delivery options for each recipient based on the extracted meta-data. Each recipient may have one or more delivery options associated with it and each delivery option may apply to one or more recipients. The e-mail modifier 412 may at element 612 modify the e-mail message for particular recipients based on the determined user-specified delivery options. In embodiments where the meta-data was removed at element 410, modification may include adding meta-data to the e-mail message to inform the recipient of the desired delivery options. In embodiments where the meta-data was not removed at element 410, modification may include removing unnecessary meta-data from the e-mail message to leave meta-data relevant to the particular recipient.

In one example, if the delivery options specified that the sender wanted a return receipt from two out of ten recipients, the e-mail modifier 412 may add to the e-mail message to be sent to those two recipients an indication that a return receipt is requested. For the eight other recipients, the e-mail modifier 412 may add no information to their e-mail messages or, alternatively, may add a note that other recipients have been requested to provide a return receipt. In another example, if the delivery options specified that four of ten recipients should have closing information (i.e., a signature), the e-mail modifier 412 may add closing information to the e-mail messages for those four recipients. In yet another example, if the delivery options specified that three of eight recipients should receive a signed e-mail message, the e-mail modifier 412 may add the sender's certificate (which may stored at mail server 106) to their e-mail messages. The e-mail modifier 412 may thus at element 612 generate a different e-mail message for each combination of delivery options.

If the e-mail modifier 412 determines at decision block 614 that the e-mail client 112 of the recipient is unsupported (or it cannot determine its status), the e-mail modifier 412 may at element 616 remove all of the meta-data from the e-mail message to that recipient so that the e-mail client 112 is not confused. Some delivery options may be accommodated even with e-mail clients 112 that do not have customized e-mail delivery modules 114. For example, if a user has requested that a recipient not receive an attachment, the e-mail modifier 412 may remove the attachment from the e-mail message for that recipient as such a delivery option does not require the cooperation of the recipient e-mail client 112.

The communication module 402 may at element 618 transmit the modified e-mail messages to the recipients, after which the method terminates. The communication module 402 may transmit directly to e-mail clients 112 of recipients that are served by the same mail server 106 as the transmitting e-mail client 112. For other recipients, the communication module 402 may transmit the e-mail message to the appropriate mail server 106 or other appropriate destination.

Figure 7:
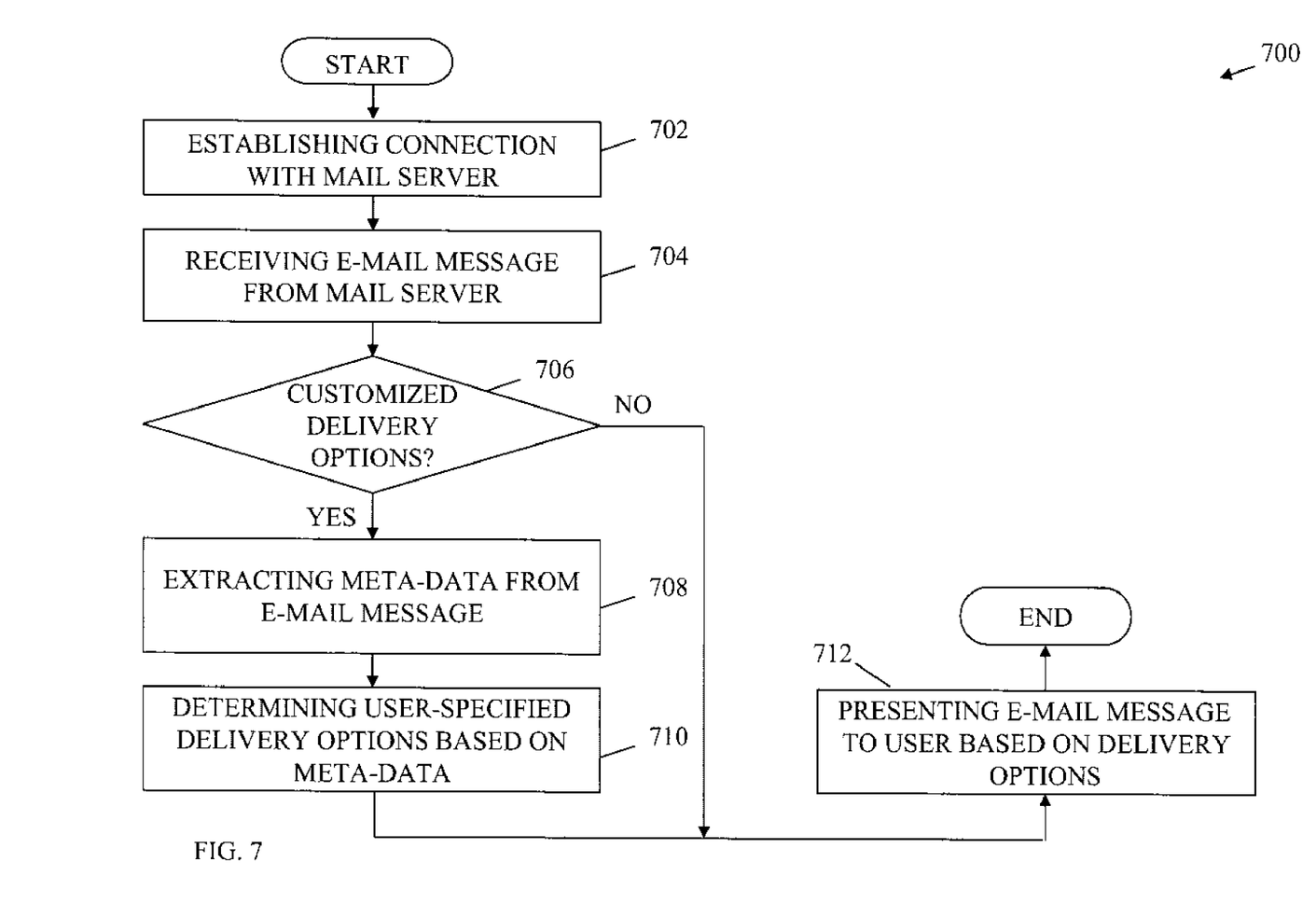
FIG. 7 depicts an example of a flow chart for receiving an e-mail with user-specified delivery options according to some embodiments.

FIG. 7 depicts an example of a flow chart 700 for receiving an e-mail with user-specified delivery options according to some embodiments. The method of flow chart 700 may be performed, in one embodiment, by components of an e-mail client 112, such as a customized e-mail delivery module 114. Flow chart 700 begins with optional element 702, where the mail server interface 304 of the e-mail client 112 may establish a connection with a mail server 106. At element 704, the mail server interface 304 may receive an e-mail message from the mail server 106. The customized e-mail delivery module 114 may determine at decision block 706 whether the received e-mail message contains meta-data associated with user-specified delivery options. If so, the meta-data extraction module 314 may extract the meta-data from the e-mail message at element 708. The meta-data extraction module 314 may then, at element 710, determine the user-specified delivery options based on the extracted meta-data. The e-mail message manager 306, in conjunction with the user interface 302, may present the e-mail message to the user based on the determined delivery options at element 712, after which the method terminates. For example, if the delivery options specified that the message had 'high' importance, it may be displayed to the user in a more prominent font or typeface or be otherwise highlighted.

It will be apparent to those skilled in the art having the benefit of this disclosure that the present invention contemplates methods, systems, and media for facilitating user-specified delivery options for e-mail messages. It is understood that the form of the invention shown and described in the detailed description and the drawings are to be taken merely as examples. It is intended that the following claims be interpreted broadly to embrace all the variations of the example embodiments disclosed.

What is claimed is:

1. A method for handling an e-mail message, the method comprising:

a computer system comprising a mail server receiving the e-mail message, the e-mail message indicating a plurality of intended recipients of the e-mail message, and the e-mail message comprising meta-data representing selected delivery options, the selected delivery options indicating, for each intended recipient of the plurality of intended recipients, one or more delivery options selected from a plurality of delivery options for delivery of the e-mail message to the intended recipient, wherein the plurality of available delivery options include two or more of:
  an option to send an attachment to the intended recipient;
  an option to send, to the intended recipient, a notification of delivery of an attachment to another intended recipient of the plurality of intended recipients;
  an option to include a signature in the e-mail message;
  an option to include closing information in the e-mail message;
  an option to deliver the e-mail message in accordance with a designated importance of the e-mail message;
  an option to receive a return receipt;
  an option to deliver the e-mail message in accordance with a delivery preference in a network;
  an option to prevent forwarding of the e-mail message;
  an option to prevent copying of the e-mail message; and
  an option to deliver the e-mail message in a specific format;

the computer system, responsive to the receiving the e-mail message, determining whether an e-mail client of a first intended recipient of the plurality of intended recipients supports receipt of the meta-data and identification therefrom of the one or more delivery options selected from the plurality of delivery options for delivery of the e-mail message to the first intended recipient, and determining whether an e-mail client of a second intended recipient of the plurality of intended recipients supports receipt of the meta-data and identification therefrom of the one or more delivery options selected from the plurality of delivery options for delivery of the e-mail message to the second intended recipient;

the computer system, responsive to determining that the e-mail client of the first intended recipient supports receipt of the meta-data and identification therefrom of the one or more delivery options selected from the plurality of delivery options for delivery of the e-mail message to the first intended recipient, transmitting to the first intended recipient the e-mail message comprising meta-data representing the selected delivery options, thereby facilitating providing by the e-mail client of the first intended recipient the e-mail message to the first intended recipient consistent with the one or more delivery options selected from the plurality of delivery options for delivery of the e-mail message to the first intended recipient; and the computer system, responsive to determining that the e-mail client of the second intended recipient does not support receipt of the meta-data and identification therefrom of the one or more delivery options selected from the plurality of delivery options for delivery of the e-mail message to the second intended recipient, creating a modified version of the e-mail message based on the one or more delivery options selected from the plurality of delivery options for delivery of the e-mail message to the second intended recipient, the creating comprising applying the one or more delivery options selected from the plurality of delivery options for delivery of the e-mail message to the second intended recipient to the modified version of the e-mail message and omitting from the modified version of the e-mail message meta-data representing selected delivery options, and the computer system transmitting the modified version of the e-mail message to the second intended recipient.

2. The method of claim 1, further comprising the computer system establishing a connection with a sending e-mail client, wherein the receiving the e-mail message comprises receiving the e-mail message from the sending email client.

3. The method of claim 2, further comprising the mail server providing return information to the sending email client.

4. The method of claim 1, wherein the plurality of delivery options include:
a first set of options of the plurality of delivery options, the first set of options restricted from selection by a sender of the e-mail message in accordance with an organizational preference; and
a second set of options of the plurality of available delivery options, the second set of options available for selection by the sender of the e-mail message in accordance with the organizational preference.

5. The method of claim 1, wherein the meta-data of the e-mail message is included in a data area of the e-mail message.

6. The method of claim 1, wherein the meta-data of the e-mail message is attached to the e-mail message.

7. The method of claim 1, wherein the meta-data into of the e-mail message is included in a header area of the e-mail message.

8. The method of claim 1, further comprising the computer system transmitting the e-mail message comprising the meta-data to a first plurality of the intended recipients including the first intended recipient and transmitting the modified version of the e-mail message to a second plurality of the intended recipients including the second intended recipient.

9. The method of claim 1, wherein the method further comprises:
the computer system creating a second modified version of the e-mail message based on the one or more delivery options selected from the plurality of delivery options for delivery of the e-mail message to a third intended recipient of the plurality of intended recipients;
and after the computer system creating the second modified version of the e-mail message, the computer system transmitting the second modified version of the e-mail message to the third intended recipient.

10. The method of claim 5, further comprising the computer system extracting the meta-data of the e-mail message from the data area of the e-mail message.

11. A computer system comprising:
a processor; and
a computer-usable storage device coupled to the processor and storing instructions that, when carried out by the processor, implement a method for handling an e-mail message, the method comprising:
the processor receiving the e-mail message, the e-mail message indicating a plurality of intended recipients of the e-mail message, and the e-mail message comprising meta-data representing selected delivery options, the selected delivery options indicating, for each intended recipient of the plurality of intended recipients, one or more delivery options selected from a plurality of delivery options for delivery of the e-mail message to the intended recipient, wherein the plurality of delivery options include two or more of:
an option to send an attachment to the intended recipient;
an option to send, to the intended recipient, a notification of delivery of an attachment to another intended recipient of the plurality of intended recipients;
an option to include a signature in the e-mail message;
an option to include closing information in the e-mail message;
an option to deliver the e-mail message in accordance with a designated importance of the e-mail message;
an option to receive a return receipt;
an option to deliver the e-mail message in accordance with a delivery preference in a network;
an option to prevent forwarding of the e-mail message;
an option to prevent copying of the e-mail message; and
an option to deliver the e-mail message in a specific format;
the processor, responsive to the receiving the e-mail message, determining whether an e-mail client of a first intended recipient of the plurality of intended recipients supports receipt of the meta-data and identification therefrom of the one or more delivery options selected from the plurality of delivery options for delivery of the e-mail message to the first intended recipient, and determining whether an e-mail client of a second intended recipient of the plurality of intended recipients supports receipt of the meta-data and identification therefrom of the one or more delivery options selected from the plurality of delivery options for delivery of the e-mail message to the second intended recipient;
the processor, responsive to determining that the e-mail client of the first intended recipient supports receipt of the meta-data and identification therefrom of the one or more delivery options selected from the plurality of delivery options for delivery of the e-mail message to the first intended recipient, transmitting to the first intended recipient the e-mail message comprising meta-data representing the selected delivery options, thereby facilitating providing by the e-mail client of the first intended recipient the e-mail message to the first intended recipient consistent with the one or more delivery options selected from the plurality of delivery options for delivery of the e-mail message to the first intended recipient; and the processor, responsive to determining that the e-mail client of the second intended recipient does not support receipt of the meta-data and identification therefrom of the one or more delivery options selected from the plurality of delivery options for delivery of the e-mail message to the second intended recipient, creating a modified version of the e-mail message based on the one or more delivery options selected from the plurality of delivery options for delivery of the e-mail message to the second intended recipient, the creating comprising applying the one or more delivery options selected from the plurality of delivery options for delivery of the e-mail message to the second intended recipient to the modified version of the e-mail message and omitting from the modified version of the e-mail message the meta-data representing the selected delivery options, and transmitting the second modified version of the e-mail message to the second intended recipient.

12. The computer system of claim 11, wherein the method further comprises the processor transmitting the e-mail message comprising the meta-data to a first plurality of the intended recipients including the first intended recipient and transmitting the modified version of the e-mail message to a second plurality of the intended recipients including the second intended recipient.

13. The computer system of claim 11, wherein the method further comprises:
the processor creating a second modified version of the e-mail message based on the one or more delivery options selected from the plurality of delivery options for delivery of the e-mail message to a third intended recipient of the plurality of intended recipients; and
after the processor creating the second modified version of the e-mail message, the processor transmitting the second modified version of the e-mail message to the third intended recipient.

14. A computer-usable tangible storage device storing computer program code, said computer program code comprising instructions executable by a processor to perform a method for handling an e-mail message, the method comprising:
the processor receiving the e-mail message, the e-mail message indicating a plurality of intended recipients of the e-mail message, and the e-mail message comprising meta-data representing selected delivery options, the selected delivery options indicating, for each intended recipient of the plurality of intended recipients, one or more delivery options selected from a plurality of delivery options for delivery of the e-mail message to the intended recipient, wherein the plurality of delivery options include two or more of:
an option to send an attachment to the intended recipient;
an option to send, to the intended recipient, a notification of delivery of an attachment to another intended recipient of the plurality of intended recipients;
an option to include a signature in the e-mail message;
an option to include closing information in the e-mail message;
an option to deliver the e-mail message in accordance with a designated importance of the e-mail message;
an option to receive a return receipt;
an option to deliver the e-mail message in accordance with a delivery preference in a network;
an option to prevent forwarding of the e-mail message;
an option to prevent copying of the e-mail message; and
an option to deliver the e-mail message in a specific format;
the processor, responsive to the receiving the e-mail message, determining whether an e-mail client of a first intended recipient of the plurality of intended recipients supports receipt of the meta-data and identification therefrom of the one or more delivery options selected from the plurality of delivery options for delivery of the e-mail message to the first intended recipient, and determining whether an e-mail client of a second intended recipient of the plurality of intended recipients supports receipt of the meta-data and identification therefrom of the one or more delivery options selected from the plurality of delivery options for delivery of the e-mail message to the second intended recipient;
the processor, responsive to determining that the e-mail client of the first intended recipient supports receipt of the meta-data and identification therefrom of the one or more delivery options selected from the plurality of delivery options for delivery of the e-mail message to the first intended recipient, transmitting to the first intended recipient the e-mail message comprising meta-data representing the selected delivery options, thereby facilitating providing by the e-mail client of the first intended recipient the e-mail message to the first intended recipient consistent with the one or more delivery options selected from the plurality of delivery options for delivery of the e-mail message to the first intended recipient; and
the processor, responsive to determining that the e-mail client of the second intended recipient does not support receipt of the meta-data and identification therefrom of the one or more delivery options selected from the plurality of delivery options for delivery of the e-mail message to the second intended recipient, creating a modified version of the e-mail message based on the one or more delivery options selected from the plurality of delivery options for delivery of the e-mail message to the second intended recipient, the creating comprising applying the one or more delivery options selected from the plurality of delivery options for delivery of the e-mail message to the second intended recipient to the modified version of the e-mail message and omitting from the modified version of the e-mail message the meta-data representing the selected delivery options, and transmitting the second modified version of the e-mail message to the second intended recipient.

15. The computer usable tangible storage device of claim 14, wherein the method further comprises the processor transmitting the e-mail message comprising the meta-data to a first plurality of the intended recipients including the first intended recipient and transmitting the modified version of the e-mail message to a second plurality of the intended recipients including the second intended recipient.

16. The computer-usable tangible storage device of claim 14, wherein the method further comprises:
the processor creating a second modified version of the e-mail message based on the one or more delivery options selected from the plurality of delivery options for delivery of the e-mail message to a third intended recipient of the plurality of intended recipients; and
after the processor creating the second modified version of the e-mail message, the processor transmitting the second modified version of the e-mail message to the third intended recipient.

* * * * *